(12) United States Patent
Krikorian et al.

(10) Patent No.: US 8,667,163 B2
(45) Date of Patent: Mar. 4, 2014

(54) SYSTEMS AND METHODS FOR PROJECTING IMAGES FROM A COMPUTER SYSTEM

(75) Inventors: Blake Gary Krikorian, Hillsborough, CA (US); Andrew E. Einaudi, San Francisco, CA (US); Alexander Gurzhi, Cupertino, CA (US); Matthew Feinstein, Palo Alto, CA (US)

(73) Assignee: Sling Media Inc., Foster City, CA (US)

( * ) Notice: Subject to any disclaimer, the term of this patent is extended or adjusted under 35 U.S.C. 154(b) by 295 days.

(21) Appl. No.: 12/408,460

(22) Filed: Mar. 20, 2009

(65) Prior Publication Data

US 2010/0064055 A1    Mar. 11, 2010

Related U.S. Application Data

(60) Provisional application No. 61/141,921, filed on Dec. 31, 2008, provisional application No. 61/095,306, filed on Sep. 8, 2008.

(51) Int. Cl.
*H04N 7/15* (2006.01)
*G06F 15/16* (2006.01)

(52) U.S. Cl.
USPC ..................... 709/231; 709/246; 725/133

(58) Field of Classification Search
USPC ................................ 709/246, 231
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,161,021 A | 11/1992 | Tsai | |
| 5,237,648 A | 8/1993 | Mills et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |

(Continued)

FOREIGN PATENT DOCUMENTS

| | | |
|---|---|---|
| CN | 1464685 | 12/2003 |
| DE | 4407319 A1 | 9/1994 |

(Continued)

OTHER PUBLICATIONS

USPTO, Final Office Action, mailed Nov. 6, 2009; U.S. Appl. No. 09/809,868, filed Mar. 15, 2001.

(Continued)

*Primary Examiner* — Patrice Winder
(74) *Attorney, Agent, or Firm* — Ingrassia Fisher & Lorenz, P.C.

(57) ABSTRACT

Methods, systems and devices are described for place shifting media content from a computer system to a remotely-located display over a network. The media content to be place shifted is captured at the computer system, wherein the media content includes a portion of imagery presented on a local display associated with the computer system. The captured media content is transcoded or otherwise converted to a media stream in a format that is transmittable on the network. The media stream is then transmitted on the network for presentation on the remotely-located display.

20 Claims, 5 Drawing Sheets

(56) References Cited

U.S. PATENT DOCUMENTS

| | | |
|---|---|---|
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga et al. |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,574 B1 * | 4/2002 | House et al. .................. 709/224 |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,670,971 B1 | 12/2003 | Oral |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 8,060,908 B2 | 11/2011 | Bountour et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |

(56) References Cited

U.S. PATENT DOCUMENTS

| | | |
|---|---|---|
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0172658 A1 | 9/2004 | Rakib et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0028208 A1 | 2/2005 | Ellis et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132299 A1* | 6/2005 | Jones et al. .................. 715/759 |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0031887 A1 | 2/2006 | Sparrell et al. |
| 2006/0050970 A1 | 3/2006 | Gunatilake |
| 2006/0051055 A1 | 3/2006 | Ohkawa |
| 2006/0080707 A1 | 4/2006 | Laksono |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0162936 A1 | 7/2007 | Stallings et al. |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0286596 A1 | 12/2007 | Lonn |
| 2008/0019276 A1 | 1/2008 | Takatsuji et al. |
| 2008/0037573 A1 | 2/2008 | Cohen |
| 2008/0059533 A1* | 3/2008 | Krikorian .................. 707/104.1 |
| 2008/0134267 A1 | 6/2008 | Moghe et al. |
| 2008/0195744 A1* | 8/2008 | Bowra et al. .................. 709/231 |
| 2008/0199150 A1 | 8/2008 | Candelore |
| 2008/0294759 A1 | 11/2008 | Biswas et al. |
| 2008/0301734 A1 | 12/2008 | Goldeen et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0119708 A1 | 5/2009 | Harrar et al. |
| 2009/0119716 A1 | 5/2009 | Ellis |
| 2009/0199248 A1 | 8/2009 | Ngo et al. |
| 2009/0249400 A1 | 10/2009 | Carlberg et al. |
| 2009/0260042 A1 | 10/2009 | Chiang |
| 2009/0271002 A1 | 10/2009 | Asofsky |
| 2010/0050221 A1* | 2/2010 | McCutchen et al. .......... 725/109 |
| 2010/0095337 A1 | 4/2010 | Dua |
| 2010/0100915 A1 | 4/2010 | Krikorian et al. |
| 2010/0153986 A1 | 6/2010 | Ellis |
| 2011/0167452 A1 | 7/2011 | Baumgartner et al. |
| 2012/0221749 A1 | 8/2012 | Karaoguz et al. |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A | 9/2007 |
| GB | 2307151 A | 5/1997 |
| KR | 19990082855 A | 11/1999 |
| KR | 20010211410 A | 8/2001 |
| WO | 0133839 A1 | 5/2001 |
| WO | 01047248 A2 | 6/2001 |
| WO | 01093161 A1 | 12/2001 |
| WO | 03026232 A1 | 3/2003 |
| WO | 03052552 A2 | 6/2003 |
| WO | 03098897 A | 11/2003 |
| WO | 2004032511 A2 | 4/2004 |
| WO | 2005050898 A2 | 6/2005 |
| WO | 2006064454 A1 | 6/2006 |
| WO | 20060074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

USPTO, Final Office Action mailed Nov. 12, 2009; U.S. Appl. No. 11/620,707, filed Jan. 7, 2007.

USPTO, Non-Final Office Action mailed Nov. 23, 2009; U.S. Appl. No. 11/683,862, filed Mar. 8, 2007.

USPTO, Non-Final Office Action mailed Oct. 1, 2009; U.S. Appl. No. 11/778,287, filed Jul. 16, 2007.

USPTO Final Office Action mailed Dec. 30, 2009; U.S. Appl. No. 11/147,664, filed Jun. 7, 2005.

European Patent Office, European Search Report, mailed Sep. 28, 2009 for European Application No. EP 06 78 6175.

International Search Report for PCT/US2008/069914 mailed Dec. 19, 2008.

(56) References Cited

OTHER PUBLICATIONS

PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Srisuresh, P. et al. "Traditional IP Network Address Translator (Traditional NAT)," Network Working Group, The Internet Society, Jan. 2001.
Lucas, Brian et al. "Systems and Methods for Establishing Connections Between Devices Communicating Over a Network," U.S. Appl. No. 12/426,103, filed Apr. 17, 2009.
Thiyagarajan, Venkatesan et al. "Always-On-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Conway, Frank et al. "Systems and Methods for Creating Variable Length Clips from a Media Stream," U.S. Appl. No. 12,347,465, filed Dec. 31, 2008.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online][Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.]
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US20061025912, mailed Jul. 17, 2008.
International Search Report for International Application No. PCT/US2008/059613, mailed Jul. 21, 2008.
International Search Report and Written Opinion for International Application No. PCT/US20081080910, mailed Feb. 16, 2009.

(56) References Cited

OTHER PUBLICATIONS

Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009.
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
European Patent Office, International Searching Authority, "International Search Report," mailed Mar. 30, 2010; International Application PCT/US2009/068468 filed Dec. 27, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
European Patent Office, International Searching Authority, "International Search Report," mailed Mar. 9, 2010; International Application No. PCT/US2009/054893, filed Aug. 25, 2009.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.

(56) References Cited

OTHER PUBLICATIONS

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
USPTO "Non-Final Office Action" mailed May 11, 2011; U.S. Appl. No. 12/408,456, filed Mar. 20, 2009.
European Patent Office, "Examination Report", mailed Sep. 12, 2011; International Appln. No. 09 791 887.4-1244.
USPTO "Final Office Action" mailed Nov. 8, 2011; U.S. Appl. No. 12/408,456, filed Mar. 20, 2009.
USPTO "Non-Final Office Action" mailed Nov. 15, 2011; U.S. Appl. No. 12/543,278, filed Aug. 18, 2009.
United States Patent and Trademark Office, Final Office Action for U.S. Appl. No. 12/543,278, dated May 29, 2012.
USPTO "Non-Final Office Action" mailed Jan. 4, 2013 for U.S. Appl. No. 12/543,278, filed Aug. 18, 2009.

\* cited by examiner

SYSTEMS AND METHODS FOR PROJECTING IMAGES FROM A COMPUTER SYSTEM

PRIORITY CLAIM

This application claims priority to U.S. Provisional Application Ser. No. 61/095,306 entitled SYSTEMS AND METHODS FOR PRESENTING MEDIA CONTENT OBTAINED FROM MULTIPLE SOURCES and filed on Sep. 8, 2008, which is incorporated herein by reference in its entirety.

This application also claims priority to U.S. Provisional Application Ser. No. 61/141,921 entitled SYSTEMS AND METHODS FOR PROJECTING IMAGES FROM A COMPUTER SYSTEM and filed on Dec. 31, 2008, which is incorporated herein by reference in its entirety.

TECHNICAL FIELD

The present disclosure generally relates to placeshifting of media content for presentation on a remotely-located television or other display.

BACKGROUND

In the past, consumers generally viewed television programming and/or other streaming content as it was received live from a network, broadcast, cable or satellite source. As analog and digital recording devices (e.g., video cassette recorders, as well as digital/personal video recorders) became more prevalent, consumers were increasingly able to shift their media viewing to more convenient viewing times. Even more recently, the ability to "place shift" media viewing from one location to another has become more widespread. Using the various SLINGBOX products available from Sling Media of Foster City, Calif., for example, consumers are able remotely view television programming or other media content that is provided by a receiver, media player, recorder or other media source that is physically located at a different place than the viewer. Traditionally, content has been place-shifted primarily from a receiver or recorder over a digital network to a personal computer, wireless phone or other portable device.

Consumers are also showing increased interest in non-traditional sources of content. Streaming video received via the Internet or another network, for example, is becoming very commonplace; such content is typically enjoyed on a computer display, however, rather than on a television set. Moreover, many consumers now have video cameras or other equipment for generating their own content. Much of this content is in digital format that is presently most readily viewed on a personal computer or other digital computing device.

As a result, it is desirable to create systems, methods and/or devices that allow placeshifting of media content from a computer system or the like to a television or other remote display. These and other desirable features and characteristics will become apparent from the subsequent detailed description and the appended claims, taken in conjunction with the accompanying drawings and this background section.

BRIEF SUMMARY

Methods, systems and devices are described for place shifting media content from a computer system to a remotely-located display over a network. The media content to be place shifted is captured at the computer system, wherein the media content includes a portion of imagery presented on a local display associated with the computer system. The captured media content is transcoded or otherwise converted to a media stream in a format that is transmittable on the network. The media stream is then transmitted on the network for presentation on the remotely-located display.

Other embodiments provide a computer program product comprising instructions stored on a digital storage medium and executable by a digital processor associated with a computer system having a local display and an interface to a network. The computer program product comprises first logic for configurably capturing the media content to be place shifted at the computer system, wherein the media content comprises a portion of imagery presented on the local display that is selected by a user of the computer system, second logic for converting the captured media content to a media stream in a format that is transmittable on the network, and third logic for transmitting the media stream on the network for presentation on the remotely-located display.

Still other embodiments provide a system for place shifting media content to a remotely-located display over a network. The system comprises a first interface to the network, a second interface to a local display, and a processor configured to capture the media content to be place shifted at the computer system, wherein the media content comprises a portion of imagery presented on the local display, to convert the captured media content to a media stream in a format that is routable on the network, and to transmit the media stream via the first interface for presentation on the remotely-located display.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary placeshifting system.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

In various embodiments, a media placeshifting system is provided that allows media content displayed on a conventional personal computer or other computer system to be shifted across a network of any sort for display at a remotely-located television or other display. That is, audio and/or visual media that is rendered at a computer system can be transmitted across the network so that the content can be enjoyed at another location. This may be beneficial, for example, in watching streaming video or other content that is traditionally viewed on a computer display on a conventional television set. Placeshifting may also be used to view custom-created content, websites, presentations and/or any other content that most conveniently rendered on a local computer display at another location or on another remote display. Different and/or additional features and benefits may be provided in any number of alternate implementations.

According to some embodiments, the placeshifting features are used in conjunction with a media catcher device that allows the customer/user to connect multiple media experiences on a common television or other display. The catcher device may be able to receive a network media stream from a remotely-located placeshifting device, for example, as well as media streams from any sort of personal computer, web server and/or other network sources. In various further embodiments, the media catcher device is also able to process content that is stored locally on a hard disk, flash drive or other digital storage device. Various embodiments of the media catcher device may therefore allow the user to access audio/visual content from multiple sources, including sources that are remotely located, on a common television or other display.

Figure 1:
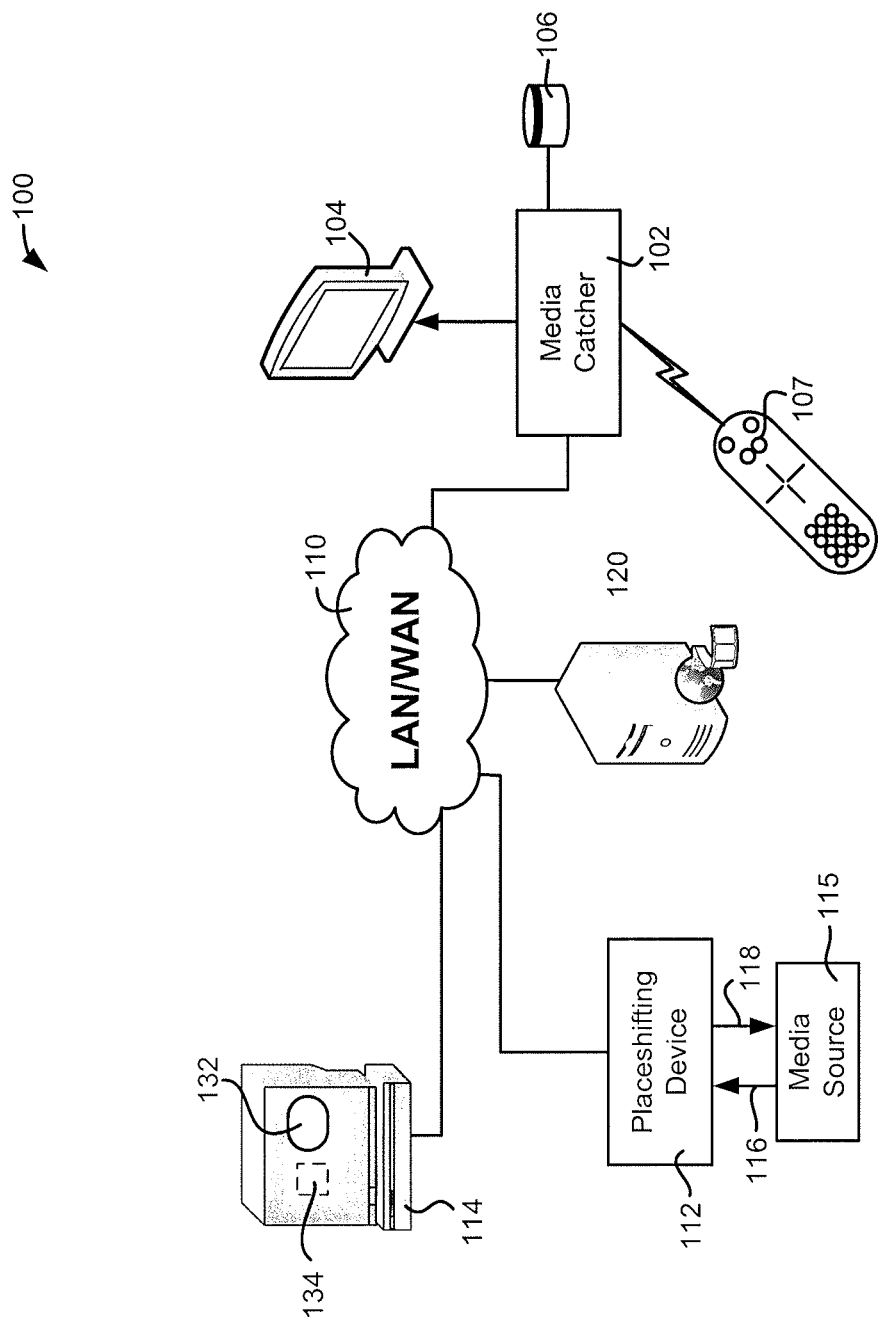

Turning now to the drawing figures and with initial reference to FIG. 1, an exemplary placeshifting system 100 suitably includes a media catcher device 102 that communicates with a placeshifting device 112, a personal computer 114, and/or any number of content servers 120 via network 110. Media catcher 102 may also receive content from a locally-connected storage device 106, as appropriate. Media content received from any of the various sources is processed at media catcher 102 to present the content to the user on display 104, and/or to otherwise create desired user experiences as appropriate.

Media catcher device 102 is any media device, component, logic or system capable of receiving content from one or more sources and of processing the received content to produce a desired experience for the user. Media catcher 102 may be any sort of media player, for example, including any type of dedicated player with an integrated or external display, or any sort of general purpose computing or communications device that is able to render media content for a viewer/user. Such devices may include, without limitation, any sort of portable or non-portable computer system, personal digital assistant, cellular or other wireless phone, video game system, media player and/or the like. In such embodiments, media catcher 102 will typically include a media player software application that is able to receive, decode and render media content streams from one or more sources for presentation on a integrated or other local display. Standalone-type media catchers 102 will also typically include software or firmware capable of receiving and decoding media streams, with decoded output provided to a television or other external display as desired. Various types of media catchers 102 may be further responsive to user commands received via a remote control 107 and/or any other input device to obtain desired content from any number of content sources, and to format the obtained content for display to the user.

Some types of media catchers 102 may incorporate a built-in display, such as the display in a laptop or other portable computer, a mobile phone, a personal digital assistant and/or the like. In other embodiments wherein media catcher 102 provides video output signals 105 to an external display 104, such signals may be provided in any compatible format. In embodiments wherein display 104 is a conventional television, for example, media catcher device 102 may provide video output signals 105 in any conventional format, such as component video, S-video, High-Definition Multimedia Interface (HDMI), Digital Visual Interface (DVI), IEEE 1394, Sony/Philips Display Interface Format (SPDIF) and/or any other formats as desired.

Many different media-shifting scenarios could be formulated based upon available computing and communications resources. In various embodiments, consumers may wish to placeshift content within a home, office or other structure, such as from a computer system 114 to a media catcher 102 associated with a television or other display 104 that may be located in another room or otherwise in relatively close physical proximity within a structure. In such embodiments, the content stream will typically be provided over a wired and/or wireless local area network operating within the structure. In other embodiments, consumers may wish to placeshift content over a broadband or similar network connection from a primary location to a media catcher device 102 located in a second home, office, hotel or other remote location.

To that end, network 110 is any digital or other communications network capable of transmitting messages between senders and receivers. In various embodiments, network 110 may represent a wide area network, a local area network, and/or any combination of wide and local area networks. In embodiments wherein media catcher 102 is located at a different building or other remote location from a desired content source, for example, network 110 can include any number of public or private data connections, links or networks supporting any number of communications protocols. Network 110 may include the Internet, for example, or any other network based upon TCP/IP or other conventional protocols. In many embodiments, system 100 is wholly or largely implemented within a relatively small geographical area (e.g., within a home or other structure). In such embodiments, network 110 may represent a conventional local area network, such as one or more IEEE 802.3 and/or IEEE 802.11 networks. Network 110 as shown in FIG. 1, then, is intended to broadly encompass any digital communications network(s), systems or architectures for transmitting data between the various components of system 100.

As noted above, media catcher device 102 is able to receive media content from any number of content sources via network 110. In various embodiments, computer 114 executes software that is able to capture, encode and transmit a video stream to media catcher 102 over network 110. The video stream may be, for example, a Windows Media, Quicktime and/or MPEG stream, although any other standard or proprietary format could be equivalently used.

In embodiments that incorporate this type of placeshifting feature, computer 114 typically executes a software program 132 that captures, encodes and transmits a portion 134 (or the entirety) of a screen display viewable on a monitor associated with computer 114. Such embodiments may, for example, encode a portion of a screen display bitmap into a streaming format that can be transmitted on the media. A media file or clip, for example, that would ordinarily be viewed on the computer display could be simultaneously (or alternately) transmitted to media catcher 102 for presentation on display 104. In other embodiments, computer 114 transmits media data in any sort of streaming, file-based, batch or other format to media catcher 102 for display as desired, and as described more fully below.

In further embodiments, media catcher 102 may be able to also receive media streams from one or more placeshifting devices 112. Placeshifting device 112 suitably packetizes media content 116 received from a media source 115 for transmission over communications network 110. To that end, placeshifting device 112 is any component, hardware, software logic and/or the like capable of transmitting a packetized stream of media content over network 110. Although FIG. 1 shows only a single placeshifting device 112, in practice system 100 may include any number of placeshifting devices 112 and/or media sources 115, each of which may be able to stream media content to media catcher 102.

Each placeshifting device 112 incorporates suitable transcoder logic to convert audio/video or other media data 116 into a packetized format (e.g., MPEG, QuickTime, Windows Media and/or the like) that can be transmitted over network 110. The media data 116 may be in any format, and may be received from any source 115 such as any digital or analog recording device (e.g., a digital video recorder); any broadcast, cable or satellite television programming source; any "video-on-demand" or similar source; a player for any sort of digital video disk (DVD) or other removable media; a security or other video camera; and/or the like. Placeshifting device 112 may also provide control instructions to one or more media sources 115 using any sort of infrared, radio frequency, or other signals 118. Such signals 118 may be provided, for example, from an "IR Blaster" or similar feature that emulates infrared or other RF instructions provided from a remote control associated with the media source 115. U.S. Patent Publication No. 2006/0095471 describes one example of a placeshifting encoder, although the concepts described herein could be used in conjunction with products and services available from any source, including those available from Sling Media of Foster City, Calif. and others.

System 100 may also include any number of servers 120 that are each capable of providing media content to media catcher 102, or of at least directing media catcher 102 to media content, as appropriate. In various embodiments, server 120 is a conventional Internet server that interacts with a browser or viewer application executing on media catcher 102 to provide images, audio, video and/or other content as desired. In further embodiments, server 120 is a web server that includes links to other content servers available to the media catcher 102. In such embodiments, a user may direct the media catcher 102 to initially contact server 120, and subsequently direct media catcher 102 to follow hypertext markup language (HTML) or other links provided by server 120. Many different interface options are available across a wide array of equivalent implementations to allow media catcher to obtain media content from any number of servers 120.

In various embodiments, media catcher 102 may be able to additionally communicate with an external storage device 106, such as any sort of disk drive, flash memory drive, and/or the like. In such embodiments, users may store media files on storage device 106 for playback on display 104. Such files may include video files, still imagery, audio files and/or any other type of media from any source. A user may keep a collection of home videos, for example, on a hard drive or other storage medium 106 that can be connected to media catcher 102.

In operation, then, media catcher 102 is able to obtain media content from one or more sources, to process the received content for playback, and to provide suitable output signals 105 for presenting the media content on display 104. In one embodiment, media catcher 102 is able to receive encoded media streams from computer 114, and may be additionally able to receive streaming and/or file-based content from placeshifting device 112, server 120 and/or local storage 106. In this embodiment, the content can be received in any of various formats and can be decoded for presentation on display 104. By designing media catcher 102 to support multiple formats and multiple sources of media content, the user is able to conveniently enjoy content from multiple sources on a common display 104. Note that media catcher 102 may be any sort of media player device, however, so the integration features described above may not be present in all embodiments.

An Exemplary Media Catcher

Figure 2A:
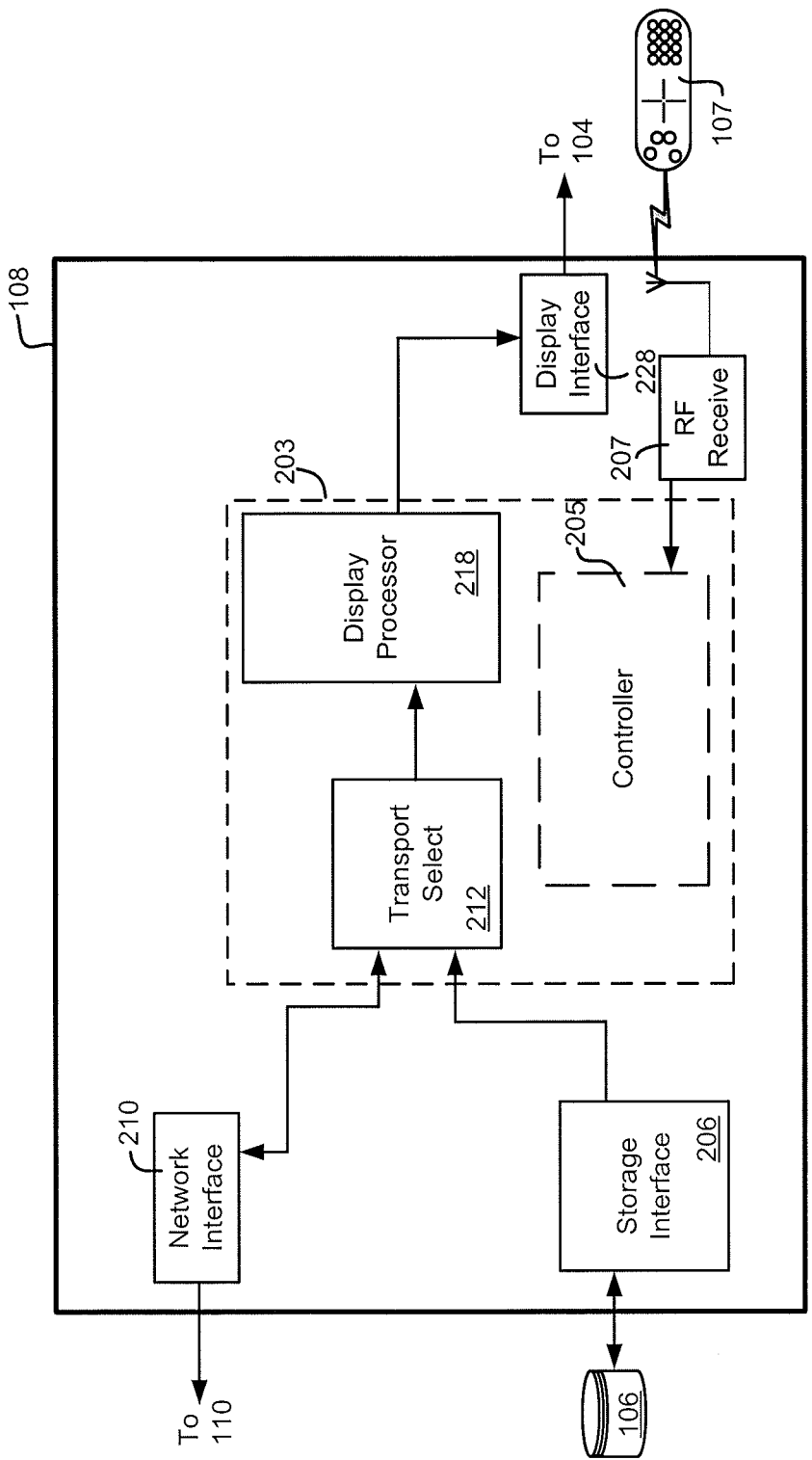
FIG. 2A is a block diagram of an exemplary media catcher system.

FIG. 2A provides additional detail about an exemplary media catcher device 102 that includes a network interface 210, a storage interface 206, and a display interface 228 as appropriate. FIG. 2A also shows a transport select module, display processor module and control module 205 executing on a common processor 203. Other embodiments may incorporate additional or alternate processing modules from those shown in FIG. 2A, and/or may omit one or more modules shown in FIG. 2A, and/or may organize the various modules in any other manner different from the exemplary arrangement shown in FIG. 2A.

Media catcher device 102 may be logically and physically implemented in any manner. FIG. 2A shows various logical and functional features that may be present in an exemplary device 102; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. In various embodiments, any number of the modules shown in FIG. 2A may be implemented as part of a "system on a chip" (SoC) using any suitable processing circuitry under control of any appropriate control logic 205. In such embodiments, control logic 205 executes within an integrated SoC or other processor that also implements transport selector 212 and display processor 218, as well as any logic that controls network interface 210 and/or storage interface 206, as appropriate. NXP Semiconductors of Eindhoven, Netherlands, for example, produces several models of processors that are capable of supporting SoC implementations, although products from any number of other suppliers could be equivalently used. In still other embodiments, various distinct chips, circuits or components may be inter-connected with each other to implement the functions represented in FIG. 2A.

Various embodiments of control logic 205 can include any circuitry, components, hardware, software and/or firmware logic capable of controlling the components and processes operating within device 102. Although FIG. 2A shows control logic 205 as a discrete feature, in practice control logic 205 will typically interact with each of the other modules and components operating within media catcher 102 to direct the operation thereof.

Media catcher 102 includes an appropriate network interface 210 that operates using any implementation of protocols or other features to support communication by device 102 on network 110. In various embodiments, network interface 210 supports conventional LAN, WAN or other protocols (e.g., the TCP/IP or UDP/IP suite of protocols widely used on the Internet) to allow device 102 to communicate on network 110 as desired. Network interface 210 typically interfaces with network 110 using any sort of LAN adapter hardware, such as a conventional network interface card (NIC) or the like provided within device 102.

Storage interface 206 is any physical, logical and/or other features that can be used to interface with an external storage medium 106 such as a magnetic or optical disk drive, a flash memory card, and/or any other sort of storage as appropriate. In various embodiments, storage interface 206 is a universal serial bus (USB), IEEE 1394 ("Firewire") or other standard interface that allows users to store files at a conventional computer system (e.g., computer 114 in some embodiments) for playback via media catcher 102. In such embodiments, media catcher 102 will typically include a physical interface that can receive the media 106, as well as a logical interface that may be implemented within the SoC or other logical features of device 102 to execute in response to control logic 205.

In many embodiments, media catcher 102 includes a wireless or other input interface 207 that receives wireless infrared or other radio frequency (RF) instructions from remote control 107. Interface 207 may additionally or alternately include any number of buttons, sliders, knobs or other physical input devices located on a housing of device 102. In operation, user instructions provided by remote control 107 and/or any other input features are received at interface 207 for subsequent processing by control logic 205. In various embodiments, control logic 205 takes appropriate actions based upon the particular inputs received; examples of appropriate actions may include directing display processor 218 to generate or modify the presented imagery, directing a command packet to be sent to a remotely-located content source, and/or any other actions.

Transport stream select module 212 is any hardware and/or software logic capable of selecting a desired media stream from the available sources. In the embodiment shown in FIG. 2A, transport select module 212 is able to select video signals for presentation on one or more output interfaces 228. Stream select module 212 therefore responds to viewer inputs (e.g., via control logic 205) to simply switch content received from a network source 210 or from storage 106 to one or more display processing modules 218.

Display processor module 218 includes any appropriate hardware, software and/or other logic to create desired screen displays at interface 228 as desired. In various embodiments, display processor module 218 is able to decode and/or transcode the received media to a format that can be presented at display interface 228. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228.

Display processing module 218 is also able to produce on screen displays (OSDs) for electronic program guide, setup and control, input/output facilitation user interface imagery and/or other features that may vary from embodiment to embodiment. Such displays are not typically contained within the received or stored broadcast stream, but are nevertheless useful to users in interacting with device 102 or the like. In particular, on-screen displays can be used to generate user interface imagery that allows for convenient program selection, control and the like, as described more fully below.

In operation, then, the user selects desired media content from a network source (e.g., placeshifting device 112, computer 114, and/or server 120 in FIG. 1), and provides appropriate inputs via remote control 107 or the like. The commands are received at input interface 207 and provided to control logic 205, as appropriate. Control logic 205 is then able to contact the appropriate content source via network interface 210, storage interface 206, and/or the like, and to select the desired content using, for example, transport select module 212. The obtained content can then be processed by display processor 218 and received at display interface 228 in an appropriate format so that output signals 105 can be compatible with the external display 104.

An Exemplary Media Projector System

Figure 2B:
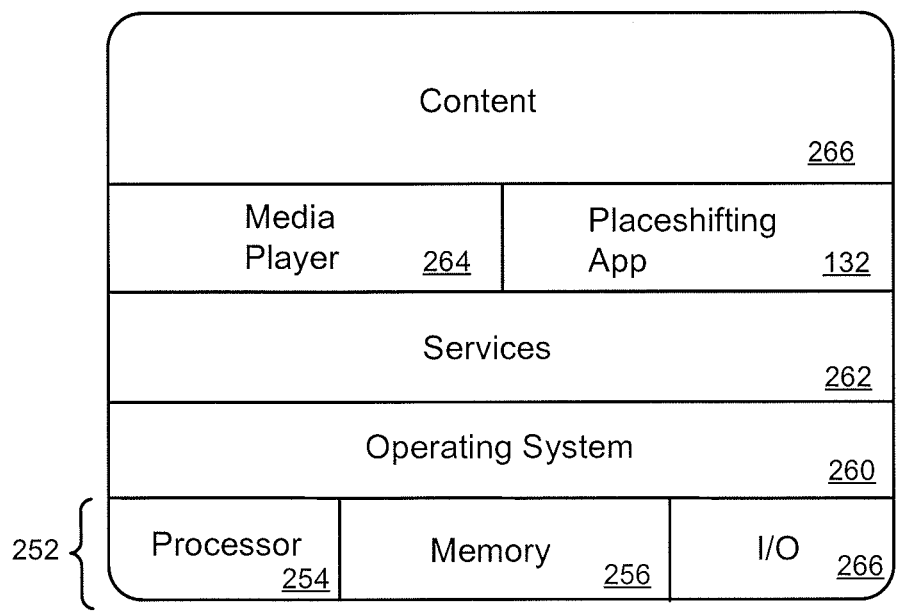
FIG. 2B is a block diagram of an exemplary computer system used for projecting a media stream.

With reference now to FIG. 2B, an exemplary computer system 114 that could be used to provide media projecting or other placeshifting functionality to any sort of media catcher 102 suitably includes a placeshifting application 132 that is able to work with a media player or other application 264 to provide media content 266 via network 110.

In various embodiments, computer system 114 includes conventional hardware features 252 such as a processor 254, memory 256, input/output features 258 and the like. Processor 254 may be any sort of general purpose microprocessor or controller, for example, or any sort of digital signal processor, programmed logic and/or the like. Memory 256 may represent any sort of random access and/or read only memory, as well as any flash or other mass storage memory associated with system 114. Input/output 258 may include any conventional features including any sort of mass storage (e.g., magnetic or optical storage, flash memory storage, and/or the like), input features (e.g., keyboard, mouse, touchpad, etc.), output features (e.g., video display, audio output) and/or any sort of communications capabilities (e.g., a network interface to network 110 or the like). In various embodiments, system 114 is a conventional personal computer-type workstation that stores programs and other instructions in disk, flash or other mass storage. Such programs can be copied to memory 256 as needed prior to execution by processor 254.

Operating system 260 is any conventional operating system that allows various programs executing on system 114 to access the various hardware features 252 described above. Many examples of operating systems are well-known, including the various versions of the WINDOWS operating systems available from the Microsoft Corporation of Redmond, Wash., the UNIX/LINUX operating systems available from a number of open source and proprietary sources, and the MacOS operating system available from the Apple Corporation of Cupertino, Calif. Any number of alternate embodiments based upon other operating systems and computing platforms could be readily created.

In various embodiments, operating system 260 operates in conjunction with one or more services 262 that provide helpful features to aid in execution of programs on computer system 114. Such services may include abstraction services such as the JAVA or ACTIVE-X products available from Sun Microsystems and the Microsoft Corporation, respectively. Other services may include graphics or other input/output related features such as the DIRECTX/DIRECT3D application programming interface available from the Microsoft Corporation, the Open Graphics Library (OpenGL) product available from numerous sources, the graphics device interface (GDI) product available as part of the Microsoft Windows operating systems, the Intel Integrated Performance Primitives (IPP) library, and/or other services as appropriate. In various embodiments, one or more services 262 may be incorporated into operating system 260 and/or into specific drivers associated with hardware 252 in any manner.

Placeshifting application 132 is any application that processes user inputs and/or media content 266 in any manner to create the media stream 308 that is provided to media catcher 102. In various embodiments, placeshifting application 132 is a conventional software application or applet that resides in memory and/or mass storage on computer system 114 and that provides some or all of the various features described herein. In some implementations, at least a portion of application 132 is initially executed at system startup and remains in system memory during operation of system 114 to facilitate rapid access to media content 266. Other embodiments may execute as a plugin or other enhancement to a conventional web browser program, or as any other sort of application, applet, object, module and/or the like.

The particular features implemented by application 132 may vary from embodiment to embodiment. Typically, application 132 is able to capture at least a portion of the display typically associated with computer system 114, to encode the captured portion of the display, and to transmit the encoded media stream to a remotely-located media catcher 102 as described above. To accomplish these various tasks, application 132 suitably interoperates with other applications and features of system 114 using operating system 260 and/or services 262. Data about media content 266 may be obtained from a video memory or other the like using one or more services 260, for example. This obtained imagery may be encoded, transcoded and/or otherwise processed as desired to create the media stream. The media stream is then transmitted over network 110 using a network interface or other conventional feature, as appropriate.

Placeshifting application 132 may obtain content for media stream 308 in any manner. In various embodiments, placeshifting application 132 communicates with a media player application 264 that receives and renders audio, visual and/or other media content as desired. Media player 264 may be any conventional media player application, including the Windows Media Player program, the iTunes program, any sort of browser program, any sort of plugin or other application associated with any sort of browser program, and/or the like. Such programs typically receive content from a local or remote source and render content for local display. Instead of simply rendering the content on a local display, however, the content may be readily placeshifted to media catcher 102 for remote viewing over network lo. Moreover, in various embodiments, placeshifting application 132 is able to communicate with one or more media players 264 to adjust the contents of the media stream. Application 132 may provide instructions to "play", "pause", "fast forward", "rewind" and/or otherwise manipulate the rendering of content by media player 264, for example. Such commands may be placed via any sort of inter-process communications provided by operating system 260, services 262 and/or other features as appropriate.

In an exemplary embodiment, video information that would typically be displayed on a local display associated with system 114 is stored in bitmap or similar format within video memory associated with hardware 252. By monitoring the information stored in the video memory associated with a window or other portion of the local display that is of interest, the information that would typically be displayed locally can be processed and transmitted over network 110 for remote viewing. This information may be accessed, for example, using conventional DirectX, IPP, DGI, OpenGL and/or other services 262, or in any other manner. In various embodiments, the particular services 262 and/or other resources used to access the video map information may vary from time to time depending upon available hardware, system load, network conditions, characteristics of the content itself, and/or other factors as appropriate. Obtained information may be filtered, encrypted, formatted and/or otherwise processed as desired to create the media stream transmitted over network 110.

Various other features may be provided in any number of alternate embodiments. Some implementations may include a "privacy mode" or other feature that allows a user of computer system 114 to prevent streaming of some or all of the display at certain times. This feature may be activated by activating a button (e.g., an actual button on a keyboard or other device, a "soft" button that is accessible via a graphical user interface on a display associated with computer system 114, or the like) or other control. In the "privacy mode", a pre-determined screen (e.g., a graphical image, blank screen, or the like) may be provided in place of a full-motion stream that may be otherwise provided.

Some embodiments may be operable to encode the video stream provided to the media catcher 102 in any number of different modes. A normal mode, for example, may be designated for conventional video processing, with frame rate, bit rate, resolution and/or any other parameters set to encode video signals. Any number of other modes could be designated for other purposes, such as presentations, photo presentation, audio only streaming, and/or the like. A "presentation" mode, for example, may have a higher resolution than a typical video streaming mode to accommodate additional picture detail and/or the like, but might also have a significantly lower frame rate that would typically be undesirable for video viewing. That is, due to the relatively infrequent changes of presentation slides or still images in comparison to motion video, the image resolution may be increased at the expense of motion frame rate. Any number of other modes could be formulated in a wide array of alternate embodiments. Such modes may be selected from remote control 107, from software executing within system 114, and/or from any other source. In still other embodiments, the particular mode may be determined automatically from the content being streamed to media catcher 102.

Further embodiments may establish encoding and/or other parameters in response to the capabilities of computer system 114. That is, the available RAM, processor speed, video processing capabilities, network processing and transmission capabilities and/or other resources available to system 114 could be used to determine the particular parameters of the encoded media stream. A system 114 with a large amount of available RAM and a fast video processing card, for example, may be able to encode a higher quality video stream than a system 114 with lesser capabilities. Conversely, a computer system 114 with comparatively limited capabilities can be assisted by reducing the resolution, bit rate, frame rate, and/or other encoding parameters of the media stream to reduce computational and other demands placed upon the system. Capabilities may be assessed in any manner (e.g., from a system registry, database and/or the like) and at any time (e.g., at software install and/or startup of application 132). Such default settings may be manually or automatically adjusted in any manner.

Still other embodiments may provide any sort of piracy protection, digital rights management, intellectual property control and/or the like. The well-known MACROVISION protection systems, for example, are commonly used to prevent copying of content stored on DVDs and other media. In various embodiments, placeshifting application 132, media player 264 and/or any other process on system 114 is able to identify protected content and to prevent streaming of such content across network 110. This may be accomplished in various embodiments by communicating with device drivers (e.g., drivers of a CD or DVD drive) to ascertain whether content is protected, and if so, to prevent subsequent streaming.

An Exemplary Placeshifting Process

In various embodiments, media catcher 102 is able to transmit control information to a remotely-located media source via network 110 to allow the viewer to adjust or otherwise control the place-shifted media stream. As user instructions are received from remote control 107, for example, control logic 205 or another feature within media catcher 102 may formulate a command request message that is transmitted over network 110 for executing at the remote media source to change the media stream provided for viewing on display 105.

Figure 3A:
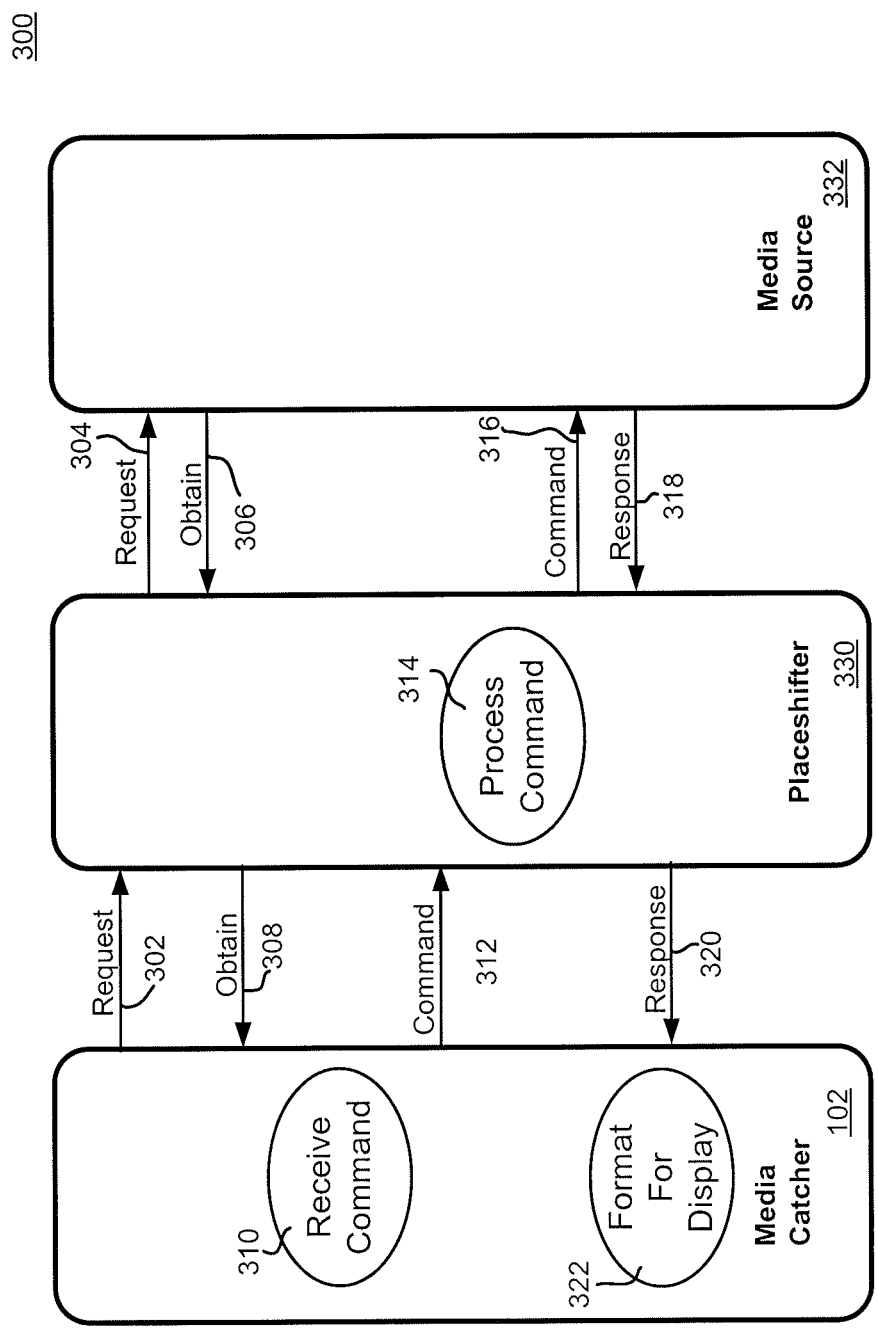
FIG. 3A is a data flow diagram of an exemplary media stream control process.

FIG. 3A shows an exemplary process 300 for transmitting command information received at a media catcher 102 for processing at a remote content source, such as media source 115 and/or media player 132. A noted in FIG. 3, media catcher 102 communicates with either a hardware placeshifting device (e.g., placeshifting device 112 in FIG. 1) or a software placeshifting application 132 in virtually the same manner. FIG. 3A therefore shows messages sent and received by various entities 102, 112/132, 115/264 involved in the exemplary process 300, as well as other actions that may be performed by one or more entities within system 100 (FIG. 1). That is, placeshifting application 132 and media player application 264 executing within computer system 114 could equivalently provide the same or similar features as placeshifting device 112 and media source 115, as described more fully below. Placeshifting device 112 and placeshifting application 132 are therefore collectively referenced as "placeshifter 330" and media sources 114 and 264 in FIGS. 1 and 2 are collectively references as "media source 332" in FIG. 3A. In practice, the overall process 300 may be implemented with various methods executed by one or more entities 102, 112, 114, and/or 115. Generally speaking, each of the steps and features shown in FIG. 3 may be implemented in software or firmware that may be stored in memory, mass storage or any other storage medium available to the executing device, and that may be executed on any processor or control circuitry associated with the executing device.

With primary reference to FIG. 3A, when a user requests viewing of a video stream from a remote placeshifter 330, media catcher 102 initially requests 302 the content from the placeshifter 330, which in turn requests 304 the content from the appropriate media source 332. While placeshifting device 120 may provide request 304 using, for example, an IR Blaster or other interface as appropriate (see signal 118 in FIG. 1), software implementations of a placeshifting application 132 may provide procedure calls or other messages to the media player application 264 via operating system 260 and/or services 262 (FIG. 2). The media source 332 suitably responds by providing the desired content 306 to the placeshifter 330, which in turn formats the content into a packet stream 308 that can be routed on network 110 to media catcher 102.

If a viewer is watching a program on display 104 that is originating at media source 332, for example, and the viewer wishes to pause, rewind, choose a different program, and/or otherwise change the programming stream 308, the viewer simply depresses the appropriate button(s) on remote 107 to send a wireless message to media catcher 102.

Media catcher 102 receives and processes the command 310 as described above (e.g., using control logic 205 or the like) and then transmits a command message 312 to placeshifter 330 via network 110. This command message 302 may be formatted, for example, in TCP/IP or UDP/IP format, and may have sufficient information contained within the message 302 to direct the remote placeshifter 330 to generate the desired command 316 to media source 332.

Command message 312 is received at placeshifting device 112 and then processed 314 to direct the media source 332 as appropriate. In various embodiments, a placeshifting device 112 may provide a command 316 via an infrared, radio frequency or other interface, although equivalent embodiments could transfer command 316 over any sort of wired interface as well. Software implementations may similarly provide command 316 and/or response 318 in any appropriate manner within operating system 260, services 262 and/or other features within computer system 114. In either case, command 316 generates the desired response 318 from media source 332, which can then be relayed as a modified media stream, command message, and/or other suitable response 320 to media catcher 102.

Content may be rendered or otherwise processed in any manner for presentation on display 104 (function 322). In various embodiments, such processing may involve converting from a streaming or other network-type format (e.g., Windows Media format or the like) to a displayable format (e.g., ITU656 or the like) that can be provided for presentation on display 104. This conversion may be provided by processor 203, for example, by a separate decoder/transcoder chip and/or by any other logic (or combinations of logic) in any number of alternate embodiments.

Other embodiments may operate in any other manner, or may eliminate such remote control functionality entirely. In embodiments that do provide the ability to transfer wireless remote instructions to a remote device over network 110, however, significant improvements to the user experience can be provided. That is, by allowing the user to transmit commands from a remote control 107 and receive results from a remotely-located media source 332, significant flexibility and convenience can be obtained.

Figure 3B:
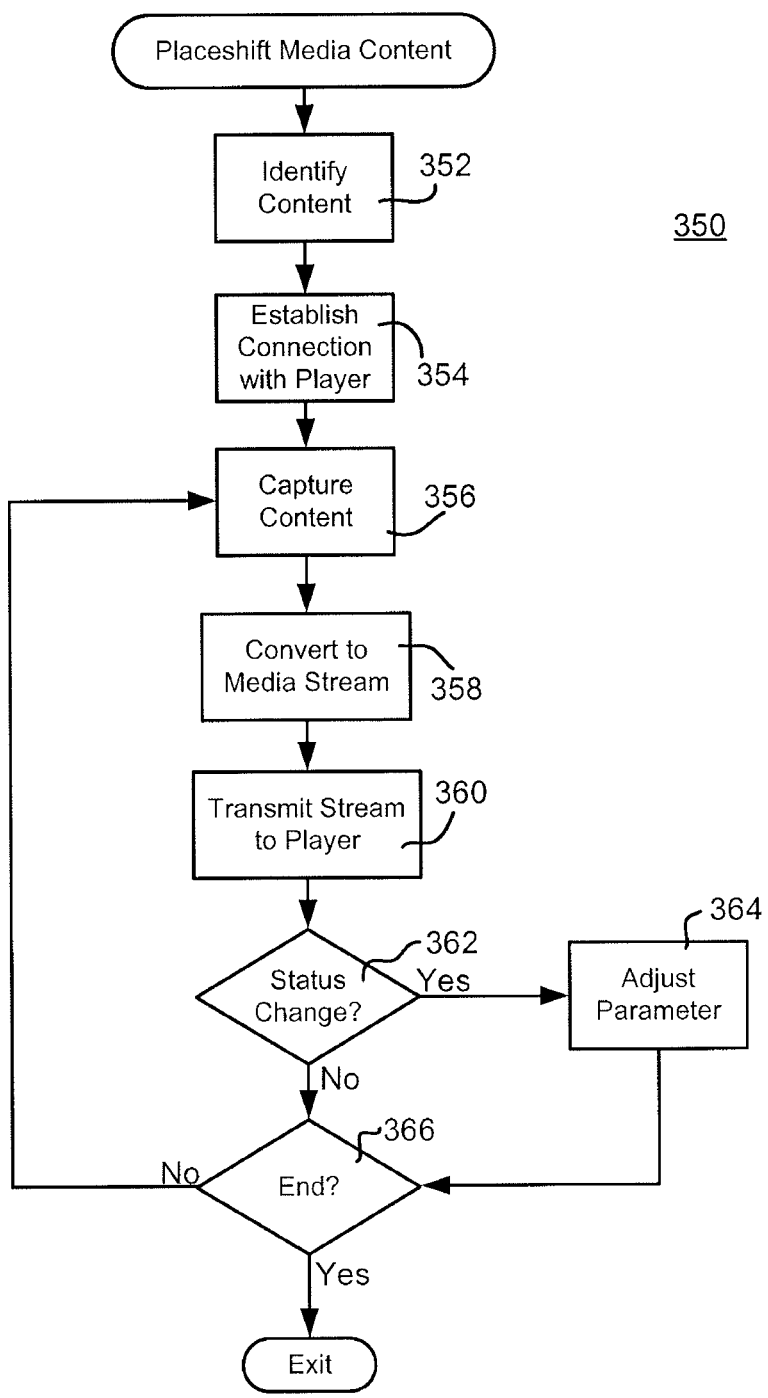
FIG. 3B is a flowchart of an exemplary process for place shifting a media stream.

FIG. 3B is an exemplary process 350 that may be used to place shift or otherwise project media content from a computer system 114 to any sort of media catcher 102 via network 110. Process 350 may be implemented in any manner; in various embodiments, each of the steps shown in process 350 may be carried out by hardware, software and/or firmware logic residing within a computer system 114 or the like. Placeshifting application 132, for example, may contain software or firmware logic that is able to be stored in memory, mass storage or any other medium and that is executable on any processor (e.g., processor 254 described above) to carry out the various steps and other features shown in FIG. 3B. To that end, the various modules shown in FIG. 3B may be implemented using software or firmware logic in any manner to create a computer program product as desired. Such software or firmware logic may be stored in any digital storage medium, including any sort of magnetic or optical disk, any sort of flash, random access or read-only memory, or any other storage medium.

Process 350 as shown in FIG. 3B suitably includes the broad steps of identifying the content for the media stream (step 352), capturing the content (step 356), converting the captured content to create the media stream (step 358), and transmitting the stream to media catcher 102 (step 360). Various further embodiments may also allow for establishing a connection with the media catcher 102 (step 354) to pre-establish one or more parameters, and/or adjusting parameters (step 364) as conditions change (step 362) during the media streaming process. Many practical embodiments may modify and/or supplement the exemplary process 350 shown in FIG. 3B in any manner. The various processing steps shown in FIG. 3B may be combined into common software or firmware modules, for example, and/or the particular logic shown in FIG. 3B may be logically, temporally and/or spatially re-arranged or supplemented in any manner.

As shown in FIG. 3B, process 350 suitably begins with any sort of identification of the media content to be place shifted (step 352). In various embodiments, a user identifies the content using conventional user interface features (e.g., mouse, keyboard, touchpad) commonly associated with computer system 114. A user may indicate that the content displayed in a particular window is to be place shifted, for example. In other embodiments, a portion of a window (e.g., a media screen contained within a web browser) may be manually or automatically identified for placeshifting. If a user is viewing a well-known webpage, for example, a portion of that page that is known to be associated with media imagery can be placeshifted without placeshifting the remainder of the window or the display. The relevant portion may be associated with a media viewer plugin, for example, or may simply be identified from the uniform resource locator (URL) of a webpage or other browser feature. In still other embodiments, a user is able to manually draw a rectangular or other window on the user interface displayed on system 114 to allow the contents of that window to be placeshifted. Drawing the window or otherwise delineating a portion of the display allows the corresponding portion of video memory to be readily identified so that bitmap or other information about the contents of the window can be obtained. Other embodiments may identify the placeshifted content in any other manner, including identification based upon inputs received from the remote media catcher 102 as appropriate. Identifying a portion of the displayed screen can have certain advantages in many embodiments, since restricting the size of the encoded imagery can dramatically reduce the amount of processing resources used to encode the images, thereby improving the user experience.

In various embodiments, a connection is initially established from the media projecting system 114 to the media catcher 102 prior to transmittal of the media stream. This allows for querying of the capabilities and/or capacity of the media player 102, which in turn can be used to ascertain an appropriate frame rate for encoding the media stream. In various embodiments, application 132 identifies media catcher 102 through an intermediating network host or the like, and obtains information from the media catcher 120 regarding an encoding frame rate and/or other parameters. In many embodiments, the initially-received frame rate will remain relatively constant throughout the duration of the media stream, even though encoding bit rate and/or other parameters may vary, as described more fully below. The connection established between computer system 114 and media catcher 102 may be established in any manner, an in accordance with any format. Conventional TCP/IP or UDP/IP constructs may be used, for example, to establish a stream according to any standard or non-standard format, such as Windows Media, Quicktime, MPEG and/or the like.

Content may be captured in any manner (step 356). In various embodiments, the identified content (or the entire monitor display) may be captured from video memory (e.g., VRAM) or the like. Such information may be obtained at any frequency to establish a desired frame rate (e.g., 30 frames/ second or so in one embodiment, although other embodiments may use any other sampling rate), and frame data that is obtained may be filtered, compressed, encrypted and/or otherwise processed in any manner. In various embodiments, the frequency at which data is obtained is determined based upon the capacity or capabilities of the remote player, based upon information received in step 354.

As noted above, the size and location of the captured region of the video display may be manually or automatically configured in any manner. Moreover, the size or location of the captured region may change during the streaming session in response to changes in the content, changes in the display, changes in the network and/or changes in the media catcher 102 as appropriate. Black (or other) padding data may be provided if needed to fill in the imagery transmitted and displayed.

The media stream is encoded in any manner (step 358). In various embodiments, the raw video frames captured from video memory may be converted from a conventional bitmap or similar format to a compressed streaming video format suitable for transmission and/or routing on network 110. Examples of such formats could include, without limitation, Windows Media format, Quicktime format, MPEG format, and/or the like. A media encoder module associated with program 132 therefore performs encoding/transcoding on the captured frames as appropriate to create the media stream in the desired format. Compression, encryption and/or other processing may be applied as well.

Audio data may be captured in addition to video data in various embodiments. Audio data may be obtained by creating an audio device driver as part of application 264 or the like. The device driver may be automatically activated when streaming is active so that system sounds are encoded into the media stream transmitted to the remote player 102.

Video, audio and/or any other streams (e.g., control streams) may be combined in any manner and transmitted on network 110 as desired (step 360). In various embodiments, the media stream is packetized into a suitable format and transmitted to media catcher over network 110 in conventional TCP/IP and/or UDP/IP packets, although other embodiments may use any other networking schemes and structures.

The media stream may be adjusted as needed (steps 362, 364). Changes in conditions of network 110, media catcher 102 and/or computer system 114, for example, could result in adjustments to one or more parameters used to encode the media stream to reflect increases or decreases in capacity. The bit rate, bit resolution, size of the captured window, and/or any other parameter could be adjusted to accommodate the changing conditions. If network 110 should become congested during media streaming, for example, the bit rate of the encoded stream could be reduced to reduce traffic on the network and to provide more information in limited available bandwidth. Similarly, if the network lo should become less heavily utilized during the streaming session, perhaps the bit rate could be increased to take advantage of the newly-available bandwidth and to provide an improved user experience. Bit rate or other parameters may be similarly adjusted in response to processor demands on system 114, or other factors as appropriate. If processor 254 (or a separate video processor, or any other resource) associated with system 114 should become more heavily utilized, for example, the bit rate or another parameter could be reduced to reduce the processing demands created by encoding the higher bit rate. Similarly, the bit rate may be increased during periods of time when the processor (or other resource) is under-utilized to take advantage of the available resources and thereby improve the user experience. By adjusting bit rate independently from frame rate, the user experience can be maintained at an acceptable level despite challenges presented by fluctuating bandwidth and/or changes in processing resources.

System resources may be monitored in any manner to determine when parameter modification should take place (step 362). In various embodiments, a transmit buffer that stores data packets prior to transmission on network lo can be monitored to determine whether adjustments to one or more encoding parameters are appropriate. If the buffer is observed to be filling faster than it is emptying, for example, then it can be readily assumed that the bit rate could be reduced to prevent overflowing of the buffer. Conversely, if the buffer is underutilized (e.g., the buffer empties at a faster rate than it is filled), then bit rate may be increased, if processing resources are available for the increased bit rate. The particular techniques used to assess whether the buffer is over or under utilized may vary from embodiment to embodiment. One or more virtual "watermarks", for example, could be assigned to the buffer, with changes in bit rate (or other parameters) taking place whenever a watermark is breached. Watermarks could be arbitrarily assigned to 25%, 50% and 75% utilization, for example, with encoding parameters adjusted whenever the buffer utilization increases or decreases past any of these values. The particular watermarks used (as well as the number of watermarks) may vary widely from embodiment to embodiment. Moreover, processor utilization may alternately or additionally be observed independently of network utilization to further determine the appropriate parameter value based upon current conditions.

In still further embodiments, the techniques used to capture and/or encode images may change based upon observed conditions. Video capture may take place using any of several techniques (e.g., using Direct3d constructs, IIP hardware features, and/or GDI interface features) based upon the availability of such features and the relative system load demanded by each one. In some applications, for example, the user may request an image from a video game or the like that requires the use of DirectX constructs for proper video capture. Other implementations, however, may be more efficiently processed using IIP hardware features even though higher level DirectX features are also available. By observing processor utilization and/or buffer fill rates using each of the available services, the most efficient service may be used based upon then-current conditions. Hence, by incorporating the flexibility of modifying one or more encoding parameters in response to observed performance, the user experience may be managed to ensure an adequate experience without over-consumption of system resources.

Various systems, devices and techniques are therefore described that allow for placeshifting of media content from a display associated with a computer system to a remote player or other type of media catcher as appropriate. As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method of place shifting moving video content presented on a computer system display to a remotely-located display over a network, the method comprising:
   receiving user inputs defining a user-selected portion of imagery presented on the computer system display, wherein the user-selected portion of the imagery comprises moving video content;
   capturing only the user-selected portion of the imagery presented on the computer system display for placeshifting to the remotely-located display, wherein the capturing comprises capturing frames of raw video data describing the user-selected portion of the imagery to thereby represent the moving video content at a frame rate;
   converting the captured frames of the raw video data from the raw video data describing the user-selected portion of the imagery into a media stream that represents the moving video content in a compressed moving video format that is transmittable on the network; and
   transmitting the converted media stream on the network for presentation of the moving video content on the remotely-located display as the moving video content is also presented in the user-selected portion of the imagery on the computer system display.

2. The method of claim 1 wherein the raw video data comprises bitmap data describing the user-selected portion of the imagery presented on the computer system display that is obtained from a video memory of the computer system.

3. The method of claim 1 wherein the user-selected portion of the video memory corresponds to a window presented on a display of the computer system.

4. The method of claim 1 further comprising receiving an input from a user that indicates a size and a position of the window, wherein both the size and the position of the window are determined by the user.

5. The method of claim 4 wherein the converting comprises encoding the captured moving video content into the format routable on the network using a configurable parameter.

6. The method of claim 5 further comprising adjusting a configurable parameter of the encoding in response to a condition of the network.

7. The method of claim 5 further comprising adjusting a configurable parameter of the encoding in response to a utilization of a transmit buffer in the computer system.

8. The method of claim 5 further comprising adjusting a configurable parameter of the encoding in response to performance of the computer system.

9. The method of claim 6 wherein the configurable parameter is a bit rate of the media stream.

10. The method of claim 1 further comprising establishing a connection with a media catcher associated with the remotely-located display for transmitting the media stream over the network at a frame rate specified by the media catcher that remains substantially constant for a duration of the connection.

11. The method of claim 1 wherein the converting comprises incorporating an audio signal associated with the moving video content into the media stream.

12. The method of claim 1 further comprising receiving an instruction from a media catcher associated with the remotely-located display over the network and adjusting the moving video content in response to the instruction.

13. A computer program product comprising instructions stored on a non-transitory digital storage medium and executable by a digital processor associated with a computer system having a local display and an interface to a network, the computer program product comprising:
   first logic configured to receive user inputs defining a user-selected portion of imagery presented on the computer system display, wherein the user-selected portion of the imagery comprises moving video content;
   second logic configured to capture only the user-selected portion of the imagery presented on the computer system display for placeshifting to a remotely-located display by capturing frames of raw video data describing the user-selected portion of the imagery to thereby represent the moving video content in the user-selected portion of the imagery at a frame rate;
   third logic configured to convert the captured frames of the raw video data from the raw video data describing the moving video content in the user-selected portion of the imagery into a media stream that represents the moving video content in a compressed moving video format that is transmittable on the network; and fourth logic configured to transmit the converted media stream on the network for presentation of the moving video content on the remotely-located display as the moving video content is also presented in the user-selected portion of the imagery on the computer system display.

14. The computer program product of claim 13 further comprising fifth logic configured to establish a connection with a media catcher associated with the remotely-located display for transmitting the media stream over the network, and wherein the frame rate is specified by the media catcher that remains substantially constant for a duration of the connection.

15. The computer program product of claim 13 wherein the raw video data is captured from a video memory of the computer system by obtaining bitmap data describing the user-selected portion of the imagery from the video memory at the frame rate.

16. The computer program product of claim 13 wherein the captured moving video content is encoded into the format routable on the network using a configurable parameter that is adjusted in response to a condition of the network.

17. A system for place shifting moving video content to a remotely-located display over a network, the system comprising:
   a first interface to the network;
   a second interface to a local display configured to display imagery to a user; and
   a processor configured to receive inputs from the user that define a user-selected portion of the imagery presented on the local display that comprises the moving video content to be place shifted, to capture only the user-selected portion of the imagery defined by the inputs for placeshifting by capturing frames of raw video data to thereby represent the moving video at a frame rate, to convert the captured frames of raw video data to a media stream that represents the moving video content in a compressed format that is routable on the network, and to transmit the converted media stream via the first interface for presentation of the moving video content on the remotely-located display as the moving video content is also presented on the local display in the user-selected portion of the imagery.

18. The system of claim 17 wherein the processor is further configured to establish a connection with a media catcher associated with the remotely-located display for transmitting the media stream over the network at a frame rate specified by the media catcher that remains substantially constant for a duration of the connection.

19. The system of claim 18 wherein the system further comprises an input device separate from the first interface that receives the inputs from the user that define the user-selected portion of the imagery presented on the local display.

20. The system of claim 18 wherein the system comprises a video memory and wherein the processor is configured to capture raw video data by obtaining bitmap data describing the user-selected portion of the imagery from the video memory at the frame rate to thereby capture frames of the moving video content.

* * * * *